(12) United States Patent
Kim et al.

(10) Patent No.: US 12,105,508 B2
(45) Date of Patent: Oct. 1, 2024

(54) CONTROL METHOD AND SYSTEM FOR ROBOT

(71) Applicant: NAVER LABS CORPORATION, Seongnam-si (KR)

(72) Inventors: Kahyeon Kim, Seongnam-si (KR); Seijin Cha, Seongnam-si (KR)

(73) Assignee: NAVER LABS CORPORATION, Gyeonggi-Do (KR)

( * ) Notice: Subject to any disclaimer, the term of this patent is extended or adjusted under 35 U.S.C. 154(b) by 449 days.

(21) Appl. No.: 17/388,279

(22) Filed: Jul. 29, 2021

(65) Prior Publication Data
US 2022/0035369 A1 Feb. 3, 2022

(30) Foreign Application Priority Data

Jul. 30, 2020 (KR) .......................... 10-2020-0094921

(51) Int. Cl.
*G05D 1/00* (2024.01)
*G06V 20/10* (2022.01)

(52) U.S. Cl.
CPC ......... *G05D 1/0038* (2013.01); *G05D 1/0044* (2013.01); *G06V 20/10* (2022.01)

(58) Field of Classification Search
CPC ..... G05D 1/0038; G05D 1/0044; G06V 20/10
USPC .......................................................... 701/2
See application file for complete search history.

(56) References Cited

U.S. PATENT DOCUMENTS

| | | | |
|---|---|---|---|
| 10,025,854 B2 * | 7/2018 | Gong ...................... G06V 40/10 | |
| 2007/0188615 A1 * | 8/2007 | Beniyama ............ G05D 1/0246 | |
| | | | 348/E7.087 |
| 2009/0143912 A1 * | 6/2009 | Wang ...................... B25J 9/1671 | |
| | | | 901/47 |
| 2015/0103178 A1 * | 4/2015 | Itoh ......................... G06V 20/41 | |
| | | | 348/159 |
| 2018/0184051 A1 | 6/2018 | Watanabe et al. | |
| 2018/0316947 A1 * | 11/2018 | Todd .................. H04N 21/2665 | |

(Continued)

FOREIGN PATENT DOCUMENTS

| | | |
|---|---|---|
| JP | 04-250380 A | 9/1992 |
| JP | 2001-315080 A | 11/2001 |

(Continued)

OTHER PUBLICATIONS

Extended European Search Report dated Oct. 29, 2021 for corresponding European Application No. 21185387.4.

*Primary Examiner* — Hunter B Lonsberry
*Assistant Examiner* — Helen Li
(74) *Attorney, Agent, or Firm* — Harness, Dickey & Pierce, P.L.C.

(57) ABSTRACT

A robot control method includes receiving, from a robot located in a space, location information of the robot; specifying, based on the received location information, at least one external camera from among a plurality of external cameras located in the space, the at least one external camera being located at a first location in the space, the first location corresponding to the received location information; receiving a robot image and at least one a space image, the robot image being an image obtained by a robot camera included in the robot and the at least one space image including at least one image obtained by the specified at least one external camera; and outputting the received robot image and at least one space image to a display unit.

11 Claims, 10 Drawing Sheets

(56) References Cited

U.S. PATENT DOCUMENTS

2020/0009734 A1* 1/2020 Kim .................. B25J 9/1697
2021/0397191 A1* 12/2021 Nakai ................ G01C 21/3841

FOREIGN PATENT DOCUMENTS

| JP | 2002-084531 A | 3/2002 |
| JP | 2005-268972 A | 9/2005 |
| JP | 2006-81053 A | 3/2006 |
| JP | 2014-16706 A | 1/2014 |
| JP | 2019-125354 A | 7/2019 |
| JP | 2019-128258 A | 8/2019 |
| KR | 10-0702147 B1 | 3/2007 |
| KR | 101305944 B1 | 9/2013 |
| WO | WO-2020/142550 A1 | 7/2020 |

* cited by examiner

FIG. 1
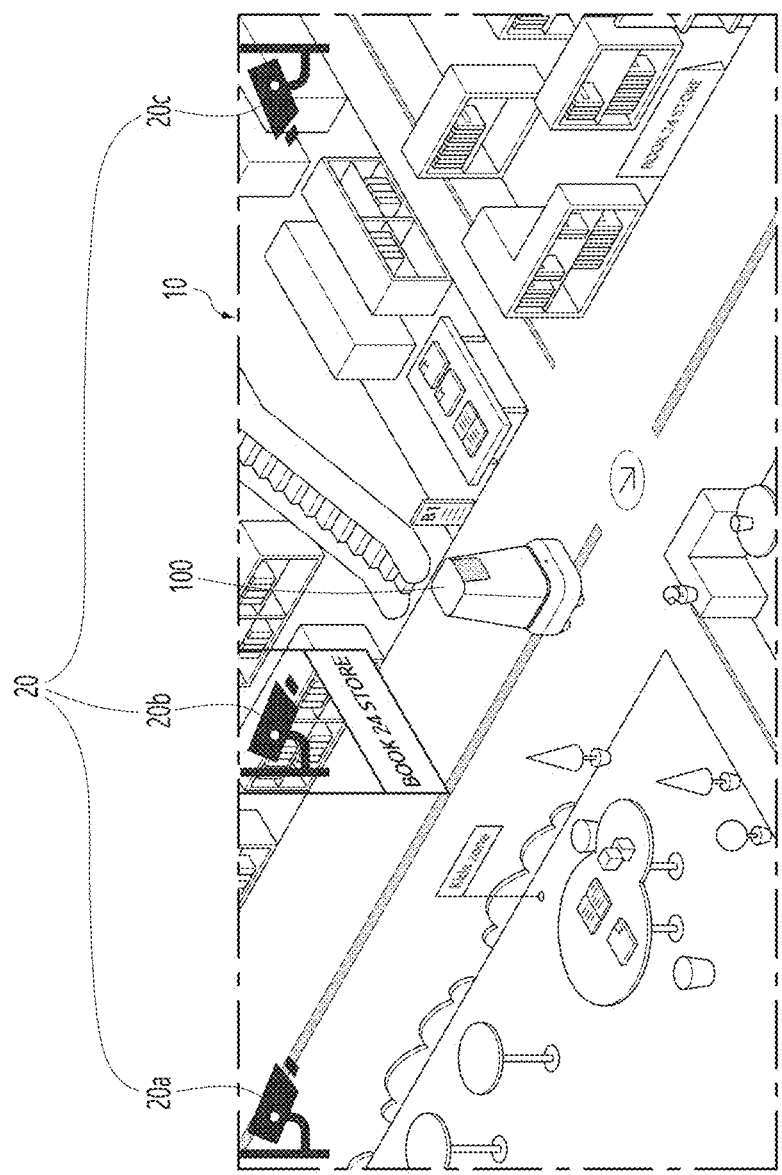
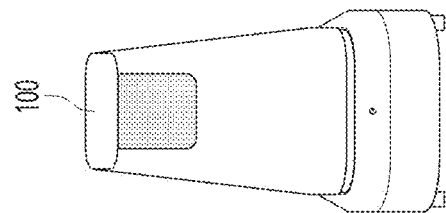

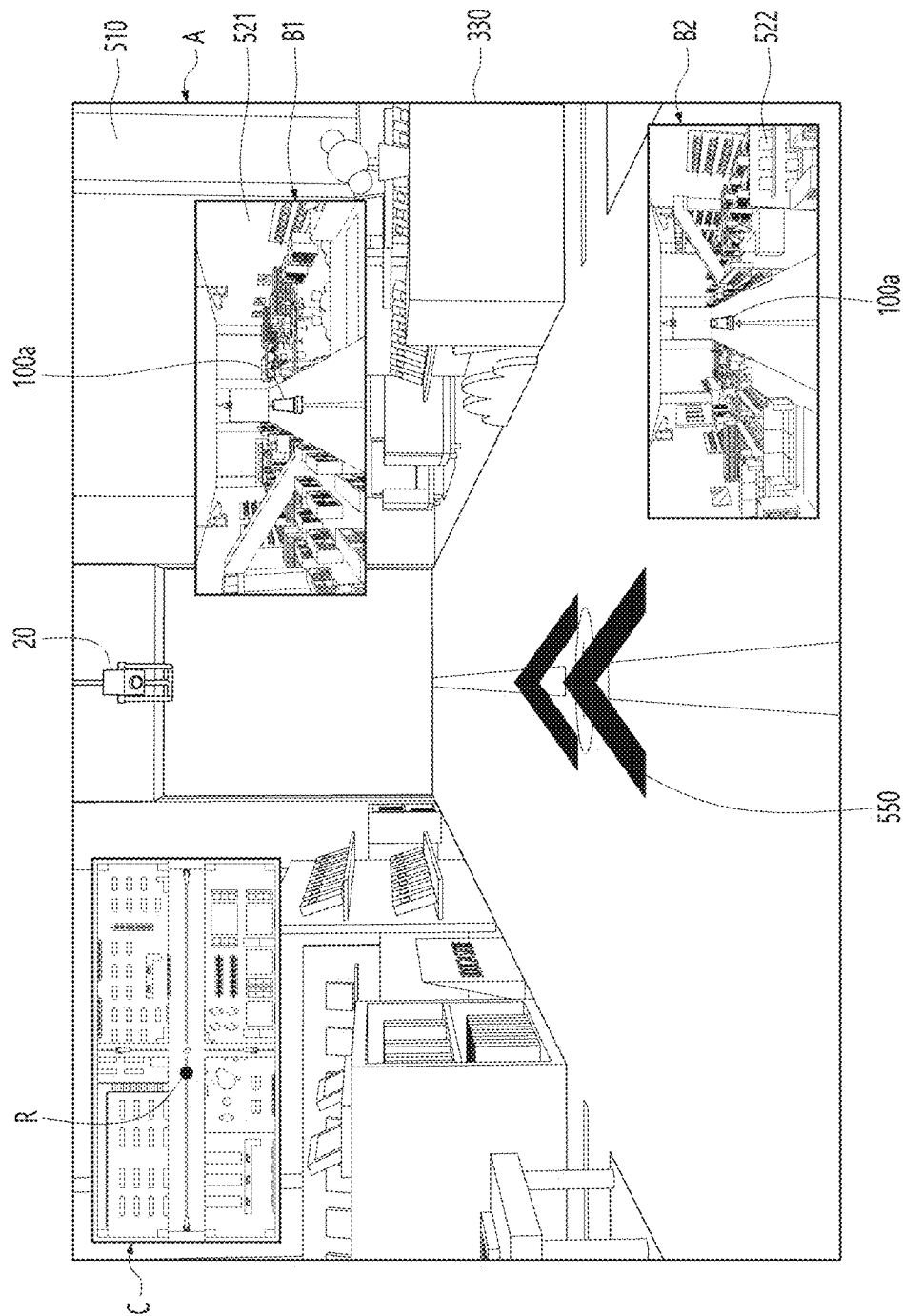

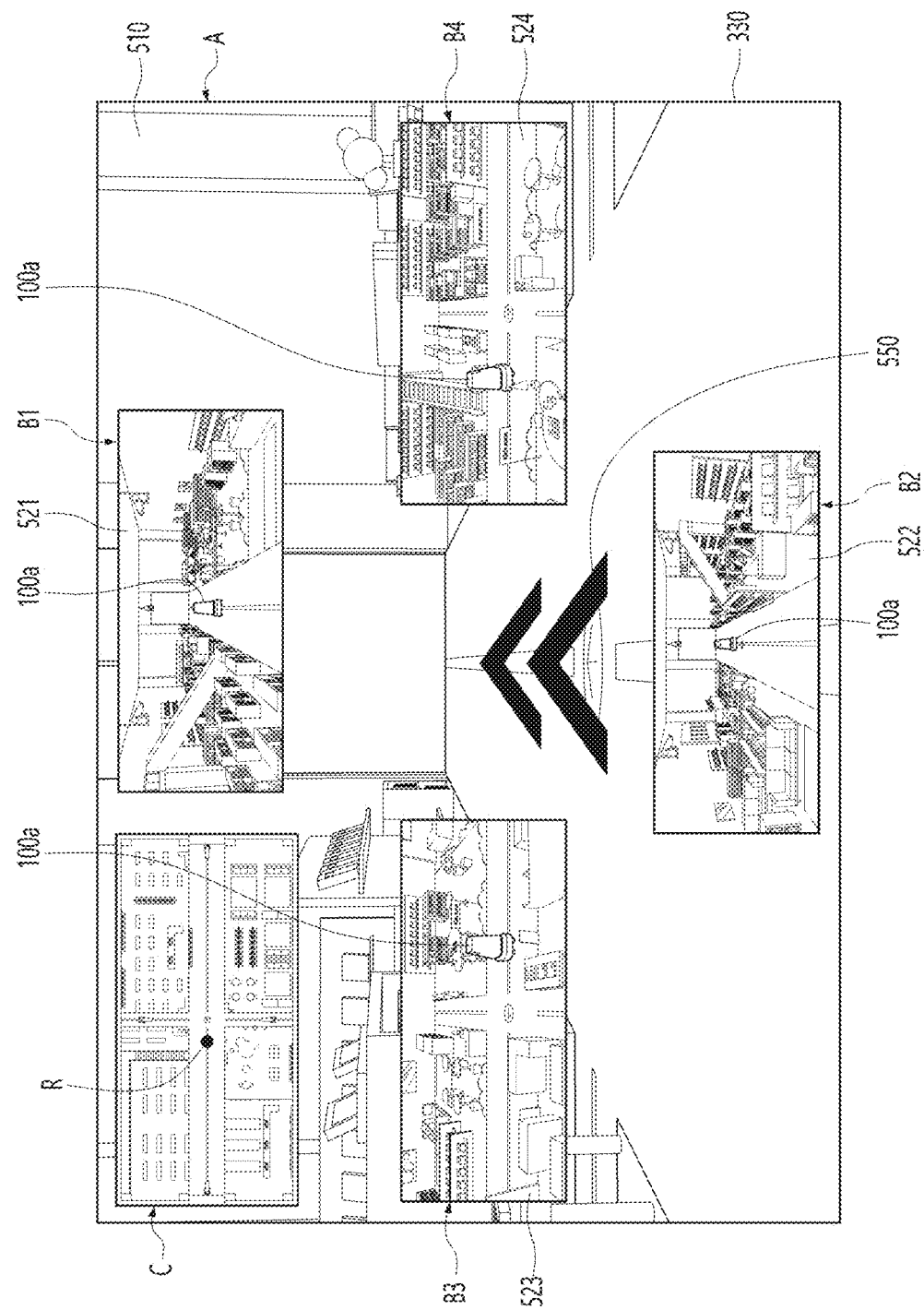

CONTROL METHOD AND SYSTEM FOR ROBOT

CROSS-REFERENCE TO RELATED APPLICATION

Pursuant to 35 U.S.C. § 119(a), this application claims the benefit of earlier filing date and right of priority to Korean Application No. 10-2020-0094921, filed on Jul. 30, 2020, the contents of which is incorporated by reference herein in its entirety.

BACKGROUND

1. Field

At least some example embodiments relate to a control method and system for a robot, and particularly, to a control method and system for a robot capable of remotely managing and controlling a robot.

2. Related Art

As technology advances, various service devices emerge. Especially in recent years, technology development for robots that perform various tasks or services is actively ongoing.

Furthermore, recently, as artificial intelligence technologies and cloud technologies have evolved, the utilization of robots is gradually increased.

On the other hand, in order to provide various tasks or services with robots, the ability to control the robot accurately is desirable. However, the needs for techniques to remotely manage and control robots become important gradually, as there are realistic limitations for users to perform a control over robots one by one.

Thus, Korean Patent Registration No. 10-1305944 (A remote control method for a robot using wrap-around images and a device therefor), discloses a technique to remotely manage and control a robot by providing cameras around the robot, acquiring images around the robot, and using the acquired images.

However, when the surroundings of the robot are identified only by the cameras included in the robot, there may occur a problem that location information indicating where the robot is located is not accurately identified. Therefore, there are still needs for a control system that can more intuitively provide location information of a robot and a surrounding environment information of the robot.

SUMMARY

At least some example embodiments provide a robot control method and system. More specifically, at least some example embodiments may provide a robot control method and system capable of remotely managing and controlling a robot more intuitively.

Furthermore, at least some example embodiments may provide a robot control method and system capable of remotely controlling a robot, by considering both a surrounding environment of a robot and a current location of the robot. More specifically, At least some example embodiments provide a robot control method and system capable of considering even blind spots of a robot.

In addition, At least some example embodiments provide a robot control method and system that provides a user environment capable of intuitively grasping the surroundings of a robot.

According to at least some example embodiments, a robot control method includes receiving, from a robot located in a space, location information of the robot; specifying, based on the received location information, at least one external camera from among a plurality of external cameras located in the space, the at least one external camera being located at a first location in the space, the first location corresponding to the received location information; receiving a robot image and at least one a space image, the robot image being an image obtained by a robot camera included in the robot and the at least one space image including at least one image obtained by the specified at least one external camera; and outputting the received robot image and at least one space image to a display unit.

The specifying of the at least one external camera may include specifying, based on a driving direction of the robot, a first camera having an angle of view that corresponds to a first area of the space, the first area corresponding to the driving direction of the robot, the outputting of the at least one space image to the display unit may include outputting a first image obtained by the first camera to a first area on the display unit, and the specified at least one external camera may include the first camera.

The specifying of the at least one external camera may further include specifying, based on a driving direction of the robot, a second camera having an angle of view that corresponds to a second area of the space, the second area corresponding to a direction opposite to the driving direction of the robot, the outputting of the at least one space image to the display unit may further include outputting a second image obtained by the second camera to a second area on the display unit that does not overlap with the first area on the display unit to which the first image is output, and the specified at least one external camera may be at least two external cameras including the first camera and the second camera.

The outputting of the robot image to the display unit may include outputting the robot image to a main area of the display unit, and the first and second areas on the display unit to which the first and second images are output, respectively, may each overlap the main area on the display unit.

Locations of the first and second areas on the display unit may be determined based on the driving direction of the robot.

The method may further include comparing a similarity between the received robot image and one or more images obtained by one or more of the plurality of external cameras located in the space.

The method may further include outputting to the display unit an image, from among the one or more images obtained by the one or more of the plurality of external cameras, having a lowest similarity to the received robot image.

The specifying of the at least one external camera may include specifying a first plurality of cameras located on a driving path of the robot, from among the plurality of external cameras, the outputting may include outputting, to the display unit, one or more space images from among a plurality of space images obtained by the first plurality of cameras; and converting the one or more space images output to the display unit during or after driving of the robot along the driving path.

The specified first plurality of cameras may include a first camera closest to the robot based on a current location of the robot, the outputting of the of the one or more space images may include changing from outputting an image obtained by a first camera to the display unit to outputting an image obtained by a second camera to the display unit, in response to a camera closest to a current location of the robot changing from the first camera to the second camera as the robot drives along the driving path, and the first plurality of cameras may include the first camera and the second camera.

The method may further include outputting a map image about a location corresponding to the location information to the display unit.

According to at least some example embodiments, a robot control system includes a display; communication circuitry configured to receive, from a robot located in a space, location information of the robot; and controller circuitry configured to specify, based on the received location information, at least one external camera from among a plurality of external cameras located in the space, the at least one external camera being located at a first location in the space, the first location corresponding to the received location information, wherein the controller circuitry is configured to, receive a robot image and at least one a space image, the robot image being an image obtained by a robot camera included in the robot and the at least one space image including at least one image obtained by the specified at least one external, and control the display to output the received robot image and at least one space image.

As described above, the robot control method and system according to at least some example embodiments may receive images from cameras placed in the space where the robot is located and provide the received images. This allows a user to grasp situation information around the robot at a glance, even if he/she is not located around the robot.

Furthermore, through this, the robot control method and system according to at least some example embodiments may provide images from cameras placed in the space where the robot is located, together with images received from the robot. This allows a user to remotely control the robot, considering even the robot's blind spots, by being provided with images having different angles of view from the camera included in the robot.

As such, at least some example embodiments provide a user environment that can comprehensively provide surrounding environment information around the robot, thereby allowing a user to perform more accurate control of the robot with consideration of the surrounding environment when controlling the robot remotely.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 1 and 2 are conceptual views illustrating a robot control method and system according to at least some example embodiments.

FIGS. 5A, 5B, 5C, 6, 7A and 7B are conceptual views illustrating a method to provide information on the surroundings of a robot in a robot control method and system according to at least some example embodiments.

DETAILED DESCRIPTION

Figure 2:
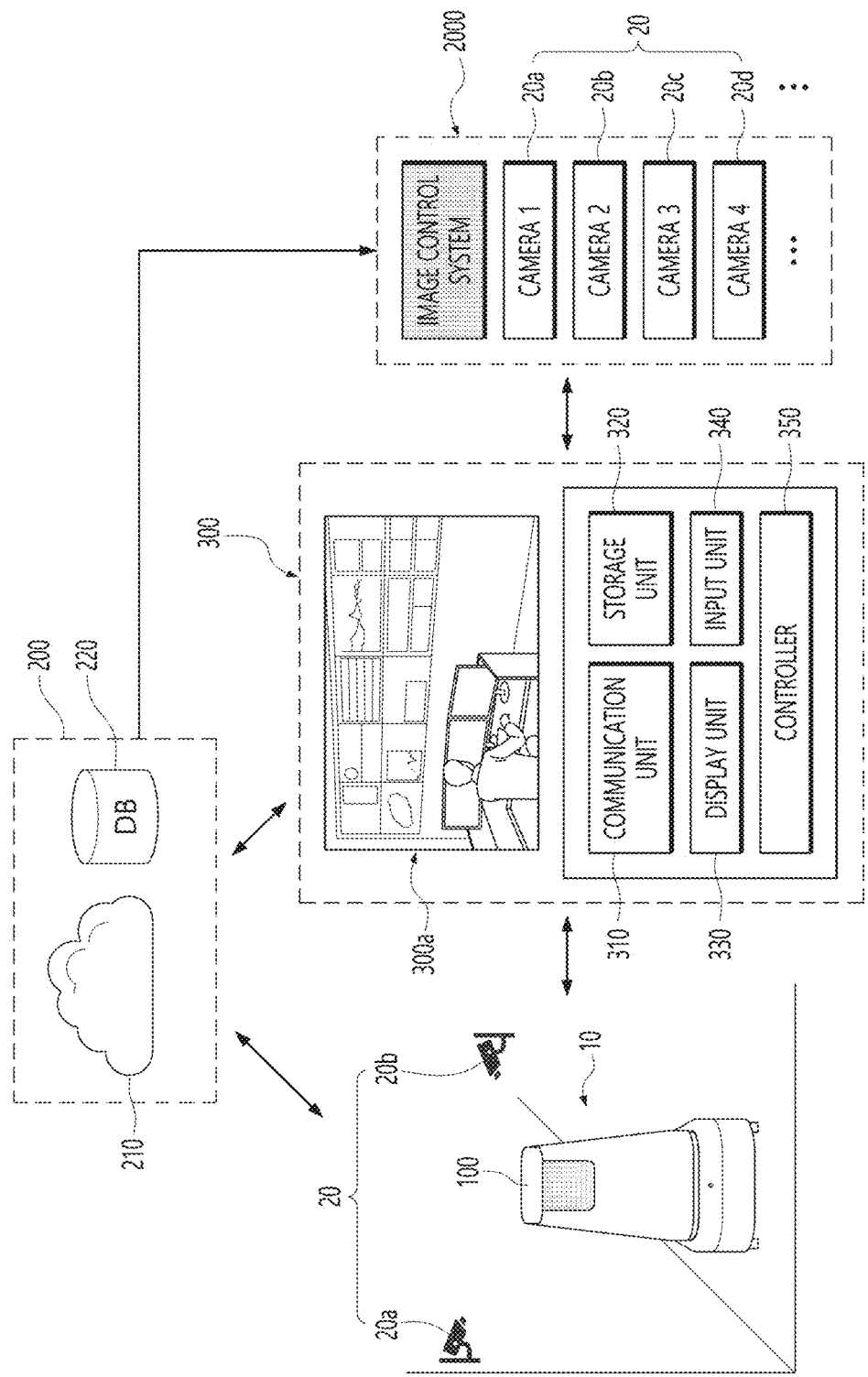

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of example embodiments described herein. Thus, it is intended that the example embodiments cover the modifications and variations of the example embodiments provided they come within the scope of the appended claims and their equivalents.

At least some example embodiments provide a robot control method and system, more particularly, provides a method and system that remotely manage and control a robot more intuitively. Hereinafter, a space where a robot drives and a robot control system surrounding the space will be described with reference to the accompanying drawings. FIGS. 1 and 2 are conceptual views illustrating a robot control method and system according to at least some example embodiments.

As shown in FIG. 1, as technology advances, the utilization of robots increases gradually. Robots have traditionally been used in special industries (e.g., industrial automation related fields), but are being gradually transformed into service robots that can perform useful tasks for humans or facilities.

A robot capable of providing such diverse services may be configured to drive in the space 10 as shown in FIG. 1, to perform assigned tasks. There is no limitation in the type of space in which the robot drives, and the robot can be made to drive at least one of indoor and outdoor spaces as needed. For example, the indoor spaces may be a variety of spaces, such as department stores, airports, hotels, schools, buildings, subway stations, train stations and bookstores. The robot may be arranged in various spaces to provide useful services to humans.

Meanwhile, in order to provide a variety of services using a robot, accurate control of the robot is a very important factor. Thus, at least some example embodiments propose a method to remotely and more accurately control a robot using a camera placed in a space together.

As shown in FIG. 1, a camera 20 may be placed in the space 10 where the robot is located. As shown, the number of the external cameras 20 placed in the space 10 is unlimited. Multiple external cameras 20a, 20b and 20c may be placed in the space 10 as shown. The types of the external cameras 20 placed in the space 10 may be various, and according to at least some example embodiments, a closed circuit television (CCTV) placed in the space may be utilized in particular.

As shown in FIG. 2, at least some example embodiments allow remote management and control of the robot 100 by a robot control system 300.

According to at least some example embodiments, "control" may be used as a comprehensive term that includes the meaning that robots may be managed, monitored, or controlled remotely. In other words, an operation (e.g., driving) of the robot 100 which is a subject to control may be controlled based on a control command received from the robot control system 300 according to at least some example embodiments.

The robot control system 300 according to at least some example embodiments may utilize images received from the external cameras 20, (e.g., CCTVs) placed in the space 10 to remotely monitor the robot or perform appropriate control. Below, a method to utilize images received from the CCTVs placed in the space for robot control will be described more specifically.

As shown in FIG. 2, the robot control system 300 according to at least some example embodiments may include at least one of a communication unit 310, a storage unit 320, a display unit 330, an input unit 340, and a controller 350.

The communication unit 310 may be configured to communicate with a variety of devices placed in the space 10 in a wired or wireless manner. The communication unit 310 may communicate with the robot 100 as shown in the drawings. The communication unit 310 may be configured to communicate with the robot 100 to receive images captured from a camera included in the robot 100. According to at least some example embodiments, the robot 100 may include one or more cameras. A camera included in the robot 100 may also be referred to, in the present specification, as a robot camera.

Furthermore, the communication unit 310 may perform direct communication with the external cameras 20. Furthermore, the communication unit 310 may be configured to communicate with an image control system 2000 that controls the external cameras 20. In the event of communication between the image control system 2000 and the communication unit 310, the robot control system 300 may receive images captured (or received or obtained) by the external cameras 20 from the image control system 2000 via the communication unit 310.

Furthermore, the communication unit 310 may be configured to communicate with at least one external server (or external storage unit 200). Here, the external server 200 may be configured to include at least one of a cloud server 210 and a database 220 as shown. According to at least some example embodiments, one or both of the external server 200 and the image control system 2000 may include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the external server 200 and/or image control system 2000 may be configured, via hardware and/or software (e.g., firmware), to perform and/or control any operation described in the specification as being performed by an external storage unit, an external server, an image control system, an external camera, or an element thereof.

According to at least some example embodiments, the external server 200, or processing circuitry included in the external server 200, may embody some or all of the controller 350. For example, according to at last some example embodiments, operations of the controller 350 including, for example, data processing and/or data computation may be performed on the external server 200.

Meanwhile, the communication unit 310 may support a variety of communication methods according to communication standards of devices with which it communicates.

For instance, the communication unit 310 may be configured to communicate with a device (including a cloud server) located in and out of the space 10, using at least one of WLAN(Wireless LAN), Wi-Fi(Wireless-Fidelity) Direct, DLNA(Digital Living Network Alliance), WiBro(Wireless Broadband), WiMAX(World Interoperability for Microwave Access), HSUPA(High Speed Uplink Packet Access), LTE(Long Term Evolution-Advanced), 5G($5^{th}$ Generation Mobile Telecommunication), Bluetooth™, RFID(Radio Frequency Identification), Infrared Data Association; IrDA, UWB(Ultra-Wideband), ZigBee, NFC(Near Field Communication), Wi-Fi Direct, and Wireless USB(Wireless Serial Bus). According to at least some example embodiments, the communication unit 310 may be implemented by circuits or circuitry. Accordingly, the communication unit 310 may also be referred to in the present specification as communication circuitry 310.

Next, the storage unit 320 includes storage (e.g., memory) for storing data. For example, the storage unit 320 may be configured to store various information related to at least some example embodiments. According to at least some example embodiments, the storage unit 320 may be included in the robot control system 300 itself. According to at least some example embodiments, some or all of the storage unit 320 may be embodied by the cloud server 210 and/or the database 220. For example, according to a least some example embodiments, the storage unit 320 is sufficient if necessary information for robot control according to at least some example embodiments is stored therein, and there is no constraint on physical space. Thus, the storage unit 320, the cloud server 210 and the database 220 are not separately identified, but all of them are described as the storage unit 320. Here, the cloud server 210 may mean "cloud storage". Furthermore, the storage unit 320 may be configured to store not only information about the robot control system 300, but also various information related to the image control system 2000.

First, in the storage unit 320, information about the robot 100 may be stored.

Information about the robot 100 may vary widely and may include, for example, i) identification information (for instance, serial numbers, TAG information, QR code information, and etc.) for identifying the robot 100 placed in the space 10, ii) task information assigned to the robot 100, iii) driving path information set to the robot 100, iv) location information of the robot 100, v) status information of the robot 100 (for example, a power condition, presence of a malfunction, a battery condition, etc.), vi) image information received from the camera(s) included in the robot 100, etc.

Next, in the storage unit 320, information about the external cameras 20 may be stored.

Information about the external cameras 20 may vary widely, and information about the external cameras 20 may include i) identification information of each camera 20a, 20b, 20c, 20d . . . (e.g., serial number, TAG information, QR code information, etc.), ii) arrangement information of each camera 20a, 20b, 20c, 20d . . . (for instance, information on an arrangement location of each camera 20a, 20b, 20c, 20d . . . in the space), iii) information on an angle of view of each camera 20a, 20b, 20c, 20d . . . (for instance, which view of the space is being captured by each camera 20a, 20b, 20c, 20d . . . ), iv) status information of each camera 20a, 20b, 20c, 20d . . . (for instance, a power state, presence of a malfunction, a battery state, etc.), v) information on images received from each camera 20a, 20b, 20c, 20d . . . , etc.

Meanwhile, the information on the external cameras 20 listed above may exist in a matched manner on the basis of each camera 20a, 20b, 20c, 20d . . . .

For example, in the storage unit 320, at least one of the identification information, the location information, the angle of view information, the status information, and the image information of the specific camera 20a may be matched with each other to exist as matching information. Such matching information may be useful for specifying a camera at a location for image viewing when the location is later specified.

Next, in the storage unit 320, a map (or map information) for the space 10 may be stored. Here, the map may be configured as at least one of a two-dimensional map and a three-dimensional map. The map for the space 10 may mean a map that may be utilized to determine a current location of the robot 100, or to set the robot's driving path.

In particular, in the robot control system 300 according to at least some example embodiments, the location of the robot 100 may be identified based on images received from the robot 100. To this end, the map for the space 10 stored in the storage unit 320 may consist of data that allows estimation of the location based on images.

Here, the map for the space 10 may be a map prepared in advance based on Simultaneous Localization and Mapping (SLAM) by at least one robot moving in the space 10.

On the other hand, in addition to the types of information listed above, various information may be stored in the storage unit 320.

Next, the display unit 330 may be configured to output images received from at least one of a camera included in the robot 100 and the cameras placed in the space 10. The display unit 330 may be or include a display (e.g., a monitor) equipped in a device of a manager who manages the robot 100 remotely, and may be installed in a remote control room 300a as shown in FIG. 2. Furthermore, in contrast, the display unit 330 may be or include a display (e.g., a touchscreen) equipped in a mobile device. As such, according to at least some example embodiments, the display unit 330 may be or include any known type of display device.

Next, the input unit 340 is for inputting information from a user (or a manager), which may be a medium between the user (or the manager) and the robot control system 300. More specifically, the input unit 340 may be embodied by an input device capable of receiving control commands from the user to control the robot 100.

Here, there are no specific restrictions on the type of the input unit 340, and the input unit 340 may include at least one of a mechanical input method (or mechanical keys, e.g., a mouse, a joystick, physical buttons, a dome switch, a jog wheel, a jog switch, etc.) and a touch-type input method. For example, the touch-type input method may be a virtual key, a soft key, or a visual key that is displayed on a touchscreen through software processing, or a touch key that is placed outside the touchscreen. Meanwhile, the virtual or visual keys may be displayed on the touchscreen in various forms, for example, graphics, texts, icons, videos, or a combination thereof. Here, when the input unit 340 includes a touch screen, the display unit 330 may be configured as a touch screen. In this instance, the display unit 330 may perform both a role of outputting information and a role of receiving information.

Next, the controller 350 may be configured to control the overall operations of the robot control system 300 related to at least some example embodiments. The controller 350 may process signals, data, information, etc. that are input or output through the components shown above, or provide or process appropriate information or functions to the user. The controller 350 may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the controller 350 may be configured, via hardware and/or software (e.g., firmware), to perform and/or control any operation described in the specification as being performed by a controller, a robot control system (e.g., robot control system 300), or an element thereof. The controller 350 may also be referred to in the present specification as controller circuitry 350.

Further, the controller 350 may provide a display environment to control the robot 100 using images received from the camera included in the robot 100 and images received from the external cameras 20 placed in the space 10.

The controller 350 may specify at least one camera placed at the location where the robot 100 is located, based on current location information of the robot 100. In particular, it is possible to extract location information where the robot 100 is located in the space from the images received from the camera included in the robot 100. In addition, the controller 350 may specify the camera corresponding to the location information of the robot 100 extracted from the storage unit 320.

Here, the specified camera may be a camera placed in a location corresponding to the robot's location information. Furthermore, the specified camera may be a camera having an angle of view corresponding to the driving direction of the robot 100.

Meanwhile, as described above, when the camera is specified, the controller 350 may control the display unit 330 to output images received from the robot and images received from the specified camera together. Furthermore, the controller 350 may also perform remote control of the robot 100, based on a user input to the display unit 330 via the input unit 340.

Meanwhile, in the above description, an example of estimating the location of the robot 100 by the controller 350 is described, but at least some example embodiments are not limited to this. In other words, location estimation of the robot 100 may be performed by the robot 100 itself. In other words, the robot 100 may estimate its current location in the way as previously described, based on images obtained by the robot 100 itself. In addition, the robot 100 may transmit the estimated location information to the controller 350. In this case, the controller 350 may perform a series of controls based on the location information received from the robot.

Meanwhile, the image control system 2000 may be configured to control at least one camera 20 placed in the space 10. As shown, multiple external cameras 20a, 20b, 20c, 20d, . . . may be placed in the space 10. Such multiple external cameras 20a, 20b, 20c, 20d, . . . may be placed at different locations within the space 10.

As such, because the multiple external cameras 20a, 20b, 20c, 20d, . . . are disposed at different locations in the space 10, the robot control system 300 may control the robot 100 remotely, using such multiple external cameras 20a, 20b, 20c, 20d, . . . .

The image control system 2000 may provide the robot control system 300 with information necessary for control of the robot 100 through mutual communication with the robot control system 300. As previously described in the configuration of the storage unit 320, the storage unit of the image control system 2000 may be configured to store various information about the camera 20. Information about the camera 20 may vary widely, and information about the camera 20 may include i) identification information of each camera 20a, 20b, 20c, 20d . . . (e.g., serial number, TAG information, QR code information, etc.), ii) arrangement location information of each camera 20a, 20b, 20c, 20d . . . (for instance, information on where each camera 20a, 20b, 20c, 20d . . . is disposed in the space, iii) information on an angle of view of each camera 20a, 20b, 20c, 20d . . . (for instance, information on which view of the space is being captured by each camera 20a, 20b, 20c, 20d . . . ), iv) status information of each camera 20a, 20b, 20c, 20d . . . (for instance, a power state, presence of a malfunction, a battery state, etc.), v) information on images received from each camera 20a, 20b, 20c, 20d . . . , etc.

Meanwhile, the information on the camera 20 listed above may exist in a matched manner on the basis of each camera 20a, 20b, 20c, 20d . . . .

For example, in the storage unit of the image control system 2000, at least one of the identification information, the location information, the angle of view information, the status information, and the image information of the specific camera 20a may be matched with each other to exist as matching information. Such matching information may be useful for specifying a camera placed at a location for image viewing when the location is later specified.

The following descriptions illustrate that the aforementioned information from the cameras is stored in the storage unit 320 for convenience of explanations, regardless of which storage unit (or storage place). In other words, information about the cameras may be stored in a variety of storage units, depending on the circumstances, so at least some example embodiments do not impose any special restrictions on them.

According to at least some example embodiments, the image control system 2000 and the robot control system 300 have separate configurations. However, at least some example embodiments are not limited to this, and the image control system 2000 and the robot control system 300 may be configured as a single integrated system. In this case, the image control system 2000 may also be referred to as a "camera part".

Figure 3:
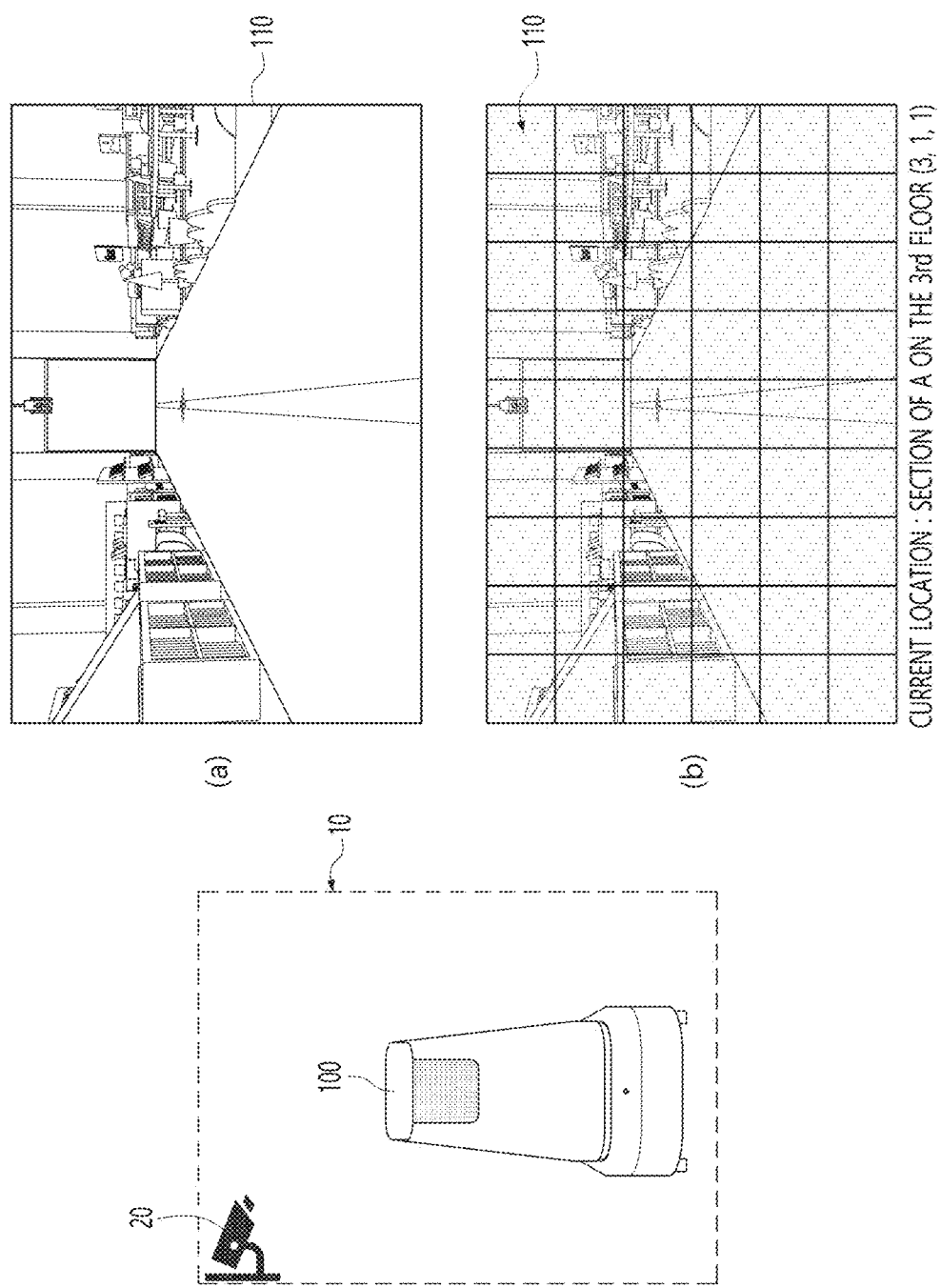
FIG. 3 is a conceptual view illustrating a method to estimate a current location of a robot based on images collected by the robot in a robot control method and system according to at least some example embodiments.

Below, descriptions will be more specifically given of a method to estimate a current location of the robot 100 based on images received from the robot 100 with the accompanying drawings. FIG. 3 is a conceptual view illustrating a method to estimate the current location of the robot based on images collected from the robot.

As described above, the controller 350 according to at least some example embodiments may be configured to, using the camera (not shown) included in the robot 100, receive images about the space 10 and to perform Visual Localization to estimate the robot's location from the received images. Here, the camera included in the robot 100 may be configured to capture (or sense) images about the space 10, e.g., images around the robot 100. Hereinafter, for convenience of explanations, images acquired by the camera included in the robot 100 will be referred to as "robot images". In addition, images acquired through the cameras placed in the space 10 are referred to as "space images".

The controller 350 may be configured to acquire a robot image 110 through the camera included in the robot 100 as shown in FIG. 3(a). In addition, the controller 350 may estimate the current location of the robot 100, using the acquired robot image 110.

The controller 350 may compare the robot image 110 with the map information stored in the storage unit 320 to extract location information (e.g., "section A on the $3^{rd}$ floor (3, 1, 1)") corresponding to the current location of the robot 100 as shown in FIG. 3(b).

As described above, the map for the space 10, according to at least some example embodiments, may be a map prepared in advance based on Simultaneous Localization and Mapping (SLAM) by at least one robot moving in the space 10. Specifically, the map for the space 10 may be a map generated based on image information.

In other words, the map for the space 10 may be a map generated by a vision (or visual)-based SLAM technology.

Thus, the controller 350 may specify coordinate information (e.g., section A (3, 1, 1)) for the robot image acquired from the robot 100, as shown in FIG. 3(*b*). As such, specific coordinate information may, namely, become the current location information of the robot 100.

Here, the controller 350 may estimate the current location of the robot 100 by comparing the robot image 110 acquired from the robot 100 with the map generated by the vision (or visual) based SLAM technology. In this case, the controller 350 may i) specify an image most similar to the robot image 110 by using image comparison between the robot image 110 and the images that constitute the pre-generated map, and ii) specify the location information of the robot 100 by acquiring location information that is matched with the specified image.

As such, the controller 350 may specify the current location of the robot, using the acquired robot image 110 when the robot image 110 is acquired from the robot 100, as shown in FIG. 3(*a*). As described above, the controller 350 may extract location information (e.g., coordinate information) corresponding to the robot image 110, from the map information stored in the storage unit 320 (e.g., may also be referred to as "reference map").

Meanwhile, in the above descriptions, was explained an example of estimating the location of the robot 100 by the controller 350, but as described earlier, localization of the robot 100 may be performed by the robot itself. In other words, the robot 100 may estimate its current location in the way as described above, based on images received from the robot itself 100. In addition, the robot 100 may transmit the estimated location information to the controller 350. In this case, the controller 350 may perform a series of controls based on the location information received from the robot.

As such, when the location information of the robot 100 is extracted from the robot image 110, the controller 350 may specify at least one camera 20 placed at a location corresponding to the above location information. The controller 350 may specify the camera 20 placed at the location corresponding to the above location information, from matching information related to the cameras stored in the storage unit 320.

In addition, for control of the robot 100, the controller 350 may output the robot image 110 acquired from the robot 100 itself, as well as images acquired from the camera 20 placed in the space where the robot 100 is located, to the display unit 330. Therefore, according to at least some example embodiments, it is possible for the manager who remotely manages and controls the robot 100, to perform remote control over the robot 100, taking into account the space in which the robot 100 is located, as well as the robot image 110 acquired from the robot 100.

Figure 4:
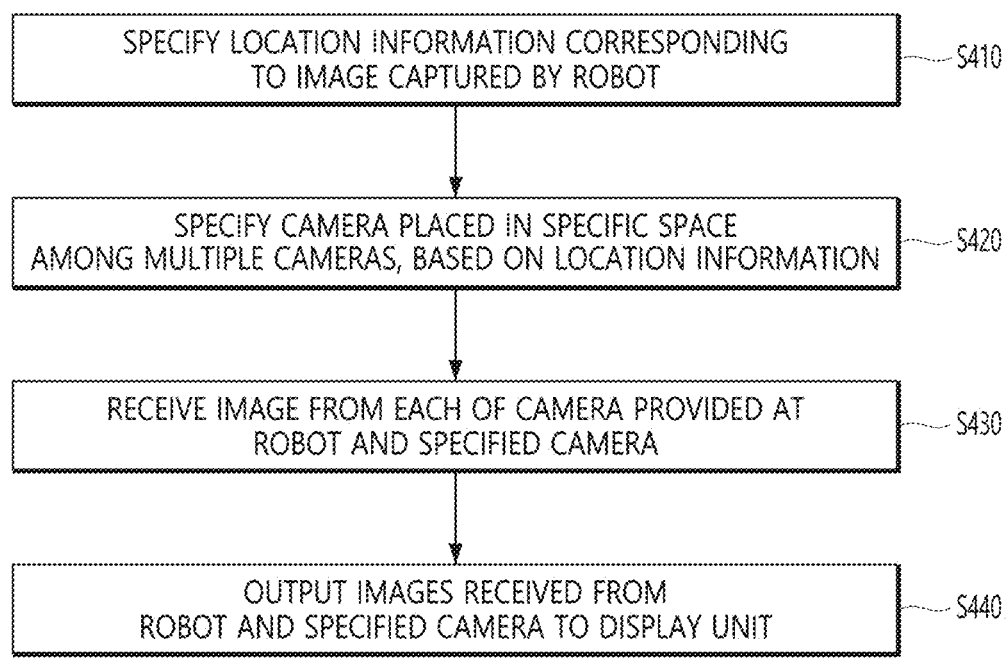
FIG. 4 is a flowchart illustrating a robot control method and system according to at least some example embodiments.

On the other hand, according to at least some example embodiments, it is possible to provide a user environment that allows users to control the robot by considering all different environments surrounding the robot by outputting the robot image and the space image together to the display unit 330. Below, descriptions will be given in detail with the accompanying drawings. FIG. 4 is a flowchart illustrating a robot control method and system according to at least some example embodiments, and FIGS. 5*a*, 5*b*, 5*c*, 6, 7*a* and 7*b* are conceptual views illustrating a method to provide information on the surroundings of a robot according to at least some example embodiments.

First, in the robot control method according to at least some example embodiments, a process of specifying location information corresponding to images captured by the robot is carried out (S410).

Here, the specific location information may include information about the location where the robot is currently located.

As described above, location information for the robot 100 may be specified by either the controller 350 or the robot 100.

When the robot's location information is specified by the robot 100, the controller 350 receives location information from the robot 100, and receiving location information from the robot 100 may be expressed as "robot's location information is specified".

Furthermore, the location information of the robot 100 may be extracted and specified by the controller 350. More specifically, the controller 350 may receive a robot image from the robot 100, using the communication unit 310. Here, the robot 100 may be a robot, a subject to control (or remote control). The specification of the robot 100, which is a subject to control, may be varied. In other words, the controller 350 may receive an image (a robot image) from the robot 100 which is a subject to control, when the specification is made in various manners.

As such, when the robot image is received from the robot 100, the controller 350 may estimate the current location of the robot 100 using the received robot image. Through the Visual Localization, the controller 350 may specify the current location of the robot 100. The controller 350 may compare the robot image with map images stored in the storage unit 320 to extract location information corresponding to the current location of the robot 100, as shown in FIG. 3*b*.

As described above, according to at least some example embodiments, a map for the space 10 may be a map prepared in advance based on Simultaneous Localization and Mapping (SLAM) by at least one robot that moves in the space 10, especially a map generated based on image information. In other words, the map for the space 10 may be a map generated by a vision (or visual) based SLAM technology.

The controller 350 may estimate the current location of the robot 100 by comparing the robot image acquired from the robot 100 with the map generated by the vision (or visual) based SLAM technology. In this case, the controller 350 may specify the location information of the robot 100 by i) specifying an image most similar to the robot image 110, using image comparison between the robot image 110 and images that constitute the pre-generated map, and ii) acquiring location information matched with the specified image.

As such, the controller 350 may specify the robot's current location, using the acquired robot image 110 when the robot image 110 is acquired from the robot 100, as shown in FIG. 3(*a*). As described above, the controller 350 may extract location information (e.g., coordinate information) corresponding to the robot image 110, from map information stored in the storage unit 320 (e.g., can also be named "reference map").

Meanwhile, the method of specifying the location information of the robot 100 by the controller 350 as described above may be accomplished by the robot 100 itself. Therefore, in this case, the role of the controller 350 may be performed by a controller of the robot.

As described above, when the location information of the robot 100 placed in the space 10 is specified, based on the above location information, the process of specifying the camera placed in a specific space among the cameras located in the space 10 may be performed (S420).

As described earlier, for the sake of convenience of explanations, images acquired using the camera included in the robot 100 are referred to as "robot images". In addition, images acquired through the cameras placed in the space 10 are referred to as "space images".

According to at least some example embodiments, the process of receiving images from the camera included in the robot 100 and through the camera specified in the process (S420), respectively, may be performed (S430). Furthermore, the display unit 330 of the control system 300 may be used to output images corresponding to the camera included in the robot and the specified camera together (S440).

According to at least some example embodiments, a graphic object corresponding to the robot 100 is given a reference numeral 100*a*.

According to at least some example embodiments, the robot control system 300 may receive a robot image and space images from the robot 100 and the camera equipped in the space, either in real time or at preset time intervals, respectively.

Figure 5A:
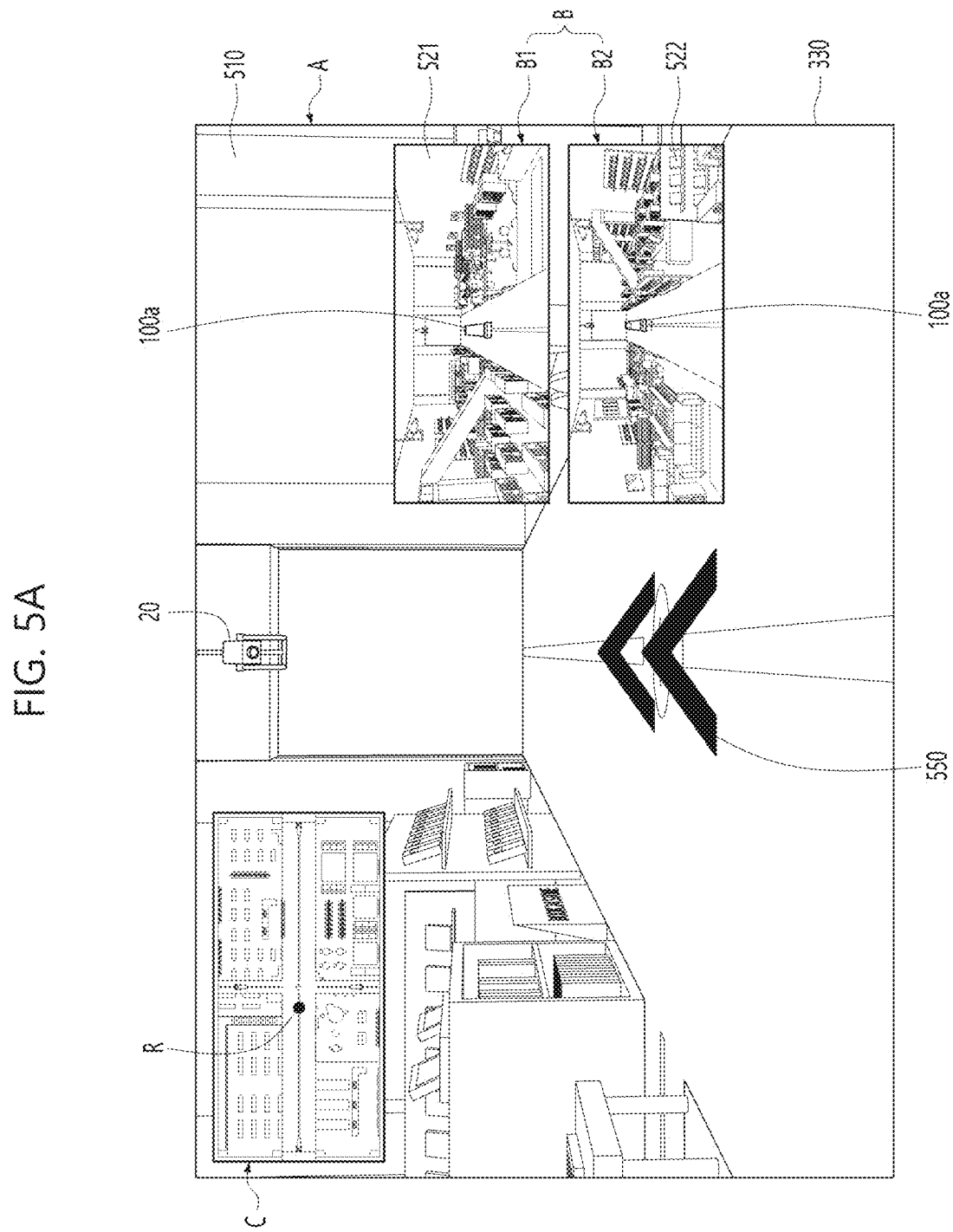

The controller 350 may control the display unit 330 to output a robot image 510 and space images 521 and 522 together, as shown in FIG. 5*a*.

As shown in FIG. 5*a*, the display unit 330 may include a main area (A) and at least one sub-area (B, B1, B2) that overlaps with at least a part of the main area (A). On the display unit 330, an area where visual information is displayed may also be referred to as "display area". In this case, the display area of the display unit 330 may be expressed to contain the main area (A) and sub-area (B) that overlaps with at least a part of the main area (A).

Meanwhile, the location where the sub-area (B) overlaps with the main area (A) may be changed based on control of the controller 350 or a user input. Furthermore, of course, an output size of at least one of the main area (A) and the sub-area (B) may also be changed based on control of the controller 350 or a user input.

In the above example, the cases where the sub-area (B) overlaps with the main area (A) are described, but at least some example embodiments are not limited to the above examples. For example, the display unit 330 may be divided into multiple display areas, one of which may be the main area (A) and at least one of which may be the sub-area (B). Here, the main area (A) and the sub-area (B) may not overlap each other, or at least a part may overlap. According to at least some example embodiments, the size of the main area (A) may be larger than that of the sub-area (B).

As shown in FIG. 5*a*, the controller 350 may comprehensively provide users with information about the space surrounding the robot 100 by outputting the robot image 510 and the space images 521 and 522 to the single display unit 330.

Furthermore, according to at least some example embodiments, the controller 350 may further provide a map image (C) including location information corresponding to the robot's current location, as shown in FIG. 5A. For example, in the example illustrated in FIG. 5A, the display unit 330 may output the robot image 510, the space images 521 and 522, and the map image (C) together.

According to at least some example embodiments, the map image (C) is an image in two or three dimension, which may be an image which visualizes the space 10 in which the robot is located. Here, the map image (C) may be configured to contain location information corresponding to the robot image 510 acquired from the robot 100. The controller 350 may specify the map image (C) corresponding to the extracted location information of the robot 100.

The map image may be in a variety of forms, and may consist of images substantially acquired from the cameras.

In this case, the map image may be configured using at least one of images acquired from the robot 100 or the camera 20 placed in the space 10.

In contrast, the map image (C) may be implemented as an image that reduces the space 10 to a certain scale, rather than an image acquired from the cameras. The map image may be an image configured to include a part of information in the space 10, rather than all of the real objects that constitute the space 10. Here, the part of information in the space 10 is necessary to determine driving and a driving path of the robot 100, and may include column information, ceiling information, wall information, space separation information, and furniture information placed in the space 10.

According to at least some example embodiments, the controller 350 may, to control the robot 100 remotely, output not only the robot image 510 obtained from the robot 100 itself, but also the map image (C) corresponding to the space in which the robot 100 is located to the display unit 330. Therefore, at least some example embodiments allow the manager who remotely control the robot 100 to comprehensively consider the environment surrounding the robot, using i) the robot image 510 acquired by the robot 100, ii) the space images 521 and 522 collected from the cameras placed in the space where the robot is located, and iii) the map image (C) of the space in which the robot is located.

When outputting the map image to the display unit 330, the controller 350 may control an output magnification of the map image (C) to provide information about the space 10 with a different magnification from the robot image 510 of the robot 100. In other words, the controller may control the output magnification of the map image (C) to provide information about the space 10 at a wider angle of view than the robot image 510. In this case, the user may consider information about the space 10 more comprehensively when remotely controlling the robot 100.

Meanwhile, as shown, a graphic object (R) representing the current location of the robot 100 in the space 10 may be further output to the map image (C). In other words, the controller 350 may use the graphic object (R) to display information about where the robot 100 is located in a space corresponding to the map image (C) such that the user more effectively manages and controls the robot 100.

As noted above, the controller 350 may output the robot image 510 acquired from the robot 100 to the main area (A) on the display unit 330, the space images 521 and 522 collected from the cameras placed in the space 10 where the robot is placed to the sub-areas (B, B1, B2) on the display unit 330, and the map image (C) including location information corresponding to the current location of the robot 100 to one area on the display unit 330.

Below, detailed descriptions will be given of a method to specify cameras that capture space images output to the sub-areas (B, B1, B2) and to arrange the sub-areas (B, B1, B2).

As shown in FIG. 1, multiple external cameras 20*a*, 20*b* and 20*c* may be placed in the space 10. These multiple external cameras 20*a*, 20*b* and 20*c* may be placed at different locations. The controller 350 may specify a camera located in the space 10 related to the robot's current location, among the cameras placed in the space 10.

More specifically, the controller 350 may specify a camera placed in a specific space corresponding to the location information, based on the location information of the robot 100.

As used in the present specification, "specifying a camera" may refer to, for example, choosing a camera to provide images output from the controller 350 to the display unit 330. Here, the controller 350 may extract identification information of a camera located in a specific space where the robot 100 is located, based on information about the camera pre-stored in the storage unit 320 (e.g., installation location information of the camera, an angle of view of the camera, etc.). In addition, the controller 350 may specify a camera corresponding to the extracted identification information of the camera as a camera placed in a specific space corresponding to the location information of the robot 100. As such, the controller 350 may specify at least one camera placed in the same or similar location as or to that of the robot 100.

Meanwhile, the "specific space" may be defined as an area within a desired or, alternatively, predetermined distance based on a spot (or place) corresponding to the location information of the robot 100.

For example, the controller 350 may specify which camera is placed within a set distance (or range), based on the location information of the robot 100, among the multiple cameras placed in the space 10. The controller 350 may extract at least one camera (or an identification of a camera) placed within a desired or, alternatively, predetermined distance from the location (or spot) corresponding to the above location information, based on information about the camera stored in the storage unit 320. In other words, the controller 350 may extract (or specify) a camera that has the same or similar location information as or to that of the robot. In this case, the location information of the robot and the location information of the camera may include coordinates (or coordinate information) for the space 10. The controller 350 may compare the coordinates corresponding to the location information of the robot and the location information of the camera, respectively, thereby extracting a camera placed in the location corresponding to the robot's current location.

The extracted camera may be specified as a camera placed in the above specific space.

Meanwhile, there may be multiple cameras placed in the above specific space, and in this instance, the controller 350 may specify a camera related to the robot's current location by various criteria.

For example, the controller 350 may specify a camera based on driving information of the robot 100. In this instance, the controller 350 may extract a camera having an angle of view corresponding to the robot's driving information. More specifically, the controller 350 may specify at least one of the multiple external cameras 20 placed in the space 10, based on the location information and the driving information of the robot 100.

The controller 350 may specify a camera based on the robot's driving direction corresponding to the driving information of the robot 100. The controller 350 may specify a camera having an angle of view corresponding to the driving direction of the robot 100 among the multiple external cameras 20 placed in the space 10. Here, the area corresponding to the driving direction of the robot 100 may be an area corresponding to a progressing direction of the robot 100. The area corresponding to the above progressing direction may be in a direction towards which the front of the robot 100 faces. As such, the controller 350 may provide information (space images) about the area corresponding to the progressing direction of the robot 100 by using the external cameras 20 placed in the space 10.

More specifically, the controller 350 may specify a first camera having a first area corresponding to the robot's driving direction as an angle of view among the multiple cameras placed in the specific space corresponding to the location information of the robot 100.

Here, the driving direction may be a direction towards which the front of the robot faces. In this case, the first area may be an area that the front of the robot faces.

As shown in FIG. 5a, the controller 350 may control the display unit 330 to output the first image (or the first space image 521) received from the first camera to a first location on the display unit 330. For example, as shown in FIG. 5a, the controller 350 may specify a camera having an angle of view that can capture an area corresponding to the robot's driving direction (or progressing direction 550) in the space 10, as a first camera. Thus, the first image (or the first space image 521) about a specific space corresponding to the robot's driving direction 550 (or progressing direction or direction that the front of the robot 100 faces) may be output to the display unit 330, together with the robot image 510.

As shown, the robot image 510 may be output to the main area (A) of the display unit 330, and the first space image 521 may be output to the sub-area (B, B1). Furthermore, as shown, the map image (C) may be output to the display unit 330.

Furthermore, the controller 350 may provide the multiple images 521 and 522 received from the multiple cameras placed in the specific space where the robot is located, on the display unit 330, as shown in FIG. 5a.

Here, the multiple images 521 and 522 may be images received from cameras having different angles of view.

For example, the controller 350 may specify a second camera having a second area corresponding to an opposite direction to the driving direction (or the progressing direction 550) of the robot 100 as an angle of view, as well as the first camera corresponding to the driving direction of the robot as aforementioned. As shown in FIG. 5a, the display unit 330 may include multiple sub-areas (B1, B2). The multiple sub-areas (B1, B2) may include a first sub-area (B1) and a second sub-area (B2). The controller 350 may output the first image (or first space image 521) received from the first camera to the first sub-area (B1), and the second image (or second space image 522) received from the second camera to the second sub-area (B2).

As shown, the second image received from the second camera (or the second space image 522) may be output to a second location not overlapped with the above location where the first image 521 is output. For example, the first sub-area (B1) and the second sub-area (B2) may be placed on the display unit 330 without being overlapped with each other.

As shown in FIG. 5a, the robot image 510 received from the robot, the first space image 521 corresponding to the robot's driving direction 550, and the second space image 522 corresponding to the direction opposite to the robot's driving direction may be output together to the display unit 330.

Meanwhile, the controller 350 may determine an output location (arrangement location) of the multiple sub-areas based on the driving direction 550 of the robot 100. In other words, the controller 350 may determine the output location of the sub-area according to which area the image being output from the sub-area corresponds to, on the basis of the robot's driving direction 550.

For example, as shown in FIG. 5b, the sub-areas (B1, B2) may include i) the first sub-area (B1) including the first space image 521 corresponding to the robot's driving direction 550, and ii) the second sub-area (B2) including the second space image 522 corresponding to the direction opposite to the robot's driving direction (rear direction of the robot). In addition, the controller 350 may determine a relative output location of the first and second sub-areas (B1, B2), on the basis of the above robot's driving direction 550. As shown, the controller 350 may dispose the first sub-area (B1) including the first space image 521 corresponding to the robot's driving direction on an upper part of the display unit 330 than the second sub-area (B2) corresponding to the direction opposite to the robot's driving direction (rear direction of the robot). The main area (A) of the display unit 330 may output the robot image 510 received from the camera mounted on the front surface of the robot 100, and when the first sub-area (B1) is placed above the second sub-area (B2), the user may intuitively see that the first sub-area (B1) is an image about the space corresponding to the driving direction.

Furthermore, as shown in FIG. 5c, when the direction that the front of the robot 100 faces is defined as "forward direction", the controller 350 may specify multiple cameras having multiple directions including the forward direction as angles of view.

For example, the controller 350 may specify a first camera facing a front direction of the robot 100, a second camera facing a rear direction of the robot 100, a third camera facing a left direction of the robot 100, and a fourth camera facing a right direction of the robot 100. In this case, as shown in FIG. 5c, the display unit 330 may output an image of the space corresponding to each of the front, rear, left and right directions of the robot 100.

An image received from the first camera (a first space image) facing the forward direction of the robot 100 may be named as "forward image", and an image received from the second camera (a second space image) facing the rear direction of the robot 100 may be named as "rear image". In addition, an image received from the third camera (a third space image) facing the right side of the robot 100 may be named as "rightward image", and an image received from the fourth camera (a fourth image) facing the left side of the robot 100 may be named as "leftward image".

The controller 350 may output the first to fourth sub-areas (B1, B2, B3, B4) to the display unit 330 under the control of the controller 350 or a user's selection, and provide space images 521, 522, 523 and 524 corresponding to the front, rear, right and left directions of the robot 100 to the first through fourth sub-areas (B1, B2, B3, B4). Thus, the user may receive comprehensive information about the space surrounding the robot 100.

Meanwhile, in the above examples, has been described a method to specify a camera based on the robot's driving direction, among the multiple cameras placed in a specific space corresponding to the current location of the robot 100. Below, will be described how to specify a camera based on a relative location with the robot.

More specifically, the controller 350 may specify multiple cameras placed on a driving path among the cameras located in the space 10, based on the driving path set to the robot 100. Here, the specified multiple cameras may be cameras placed in a specific space where the robot 100 drives along the driving path.

Since a very large number of cameras may be placed in the space 10, if multiple cameras located on the driving path are firstly specified, computational time required to specify a camera associated with the robot's changed current location due to driving of the robot may be reduced.

As such, the controller 350 may primarily select multiple cameras to provide space images based on the driving path of the robot 100, and perform a conversion between images provided from the multiple selected cameras depending on the driving degree of the robot 100 (for convenience of explanations, a camera having an angle of view towards the robot's driving direction will be referred to as an example).

As an example, the controller 350 may specify multiple cameras, using the robot's current location information and the robot's driving path information. The controller 350 may specify the multiple cameras placed on the driving path of the robot 100 as cameras located in a specific space corresponding to the robot's location information, based on the robot's current location information. Here, the controller 350 may output an image received from a camera that meets a preset criteria (e.g., camera closest to the robot 100) based on the current location of the robot 100, among the multiple cameras located on the above driving path.

As shown in FIGS. 6(a) and (b), the controller 350 may control the display unit 330 such that a conversion is performed between images received from the multiple specific cameras, in conjunction with driving of the robot 100 along the driving path.

Figure 6:
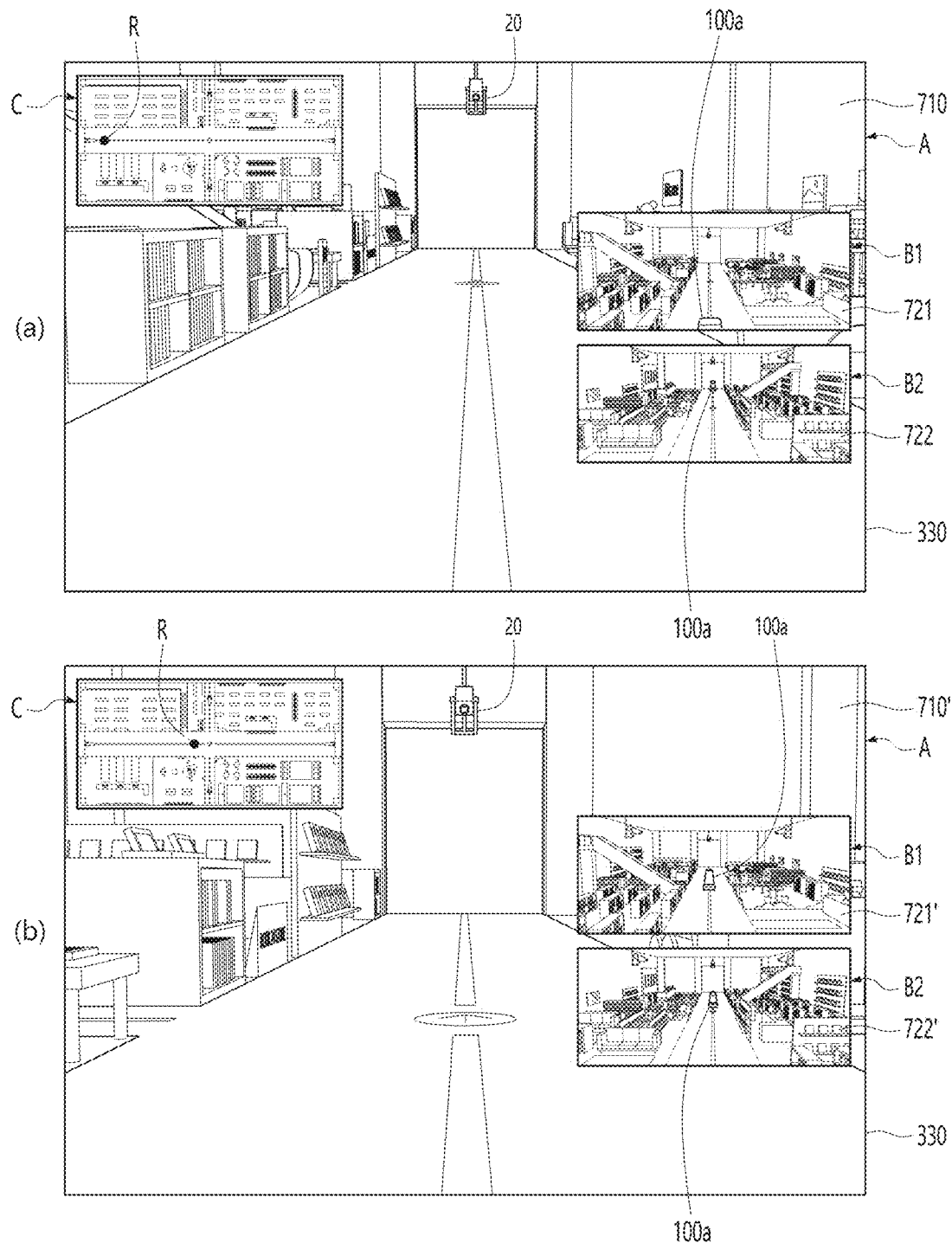

As shown, images 721 and 721' output to the first sub-area (B1) and images 722 and 722' output to the second sub-area (B2) may be switched from each other as the robot 100 drives. The controller 350 may specify a secondary camera closest to the robot 100 based on the changed current location of the robot 100 among the multiple pre-specified cameras placed on the driving path of the robot 100, when the robot 100 changes its current location according to driving. The conversion between the multiple images received from the multiple cameras located on the driving path of the primary selected robot 100 may be performed based on update of the robot's current location information. As used in the present specification, "conversion"/"converting" of an image or an image being "converted" may refer to, for example, updating an image that is displayed on an area of the display unit to a more recent version of the image, for example, during or after movement of the robot 100 along a driving path. For example, as is shown in FIG. 6, "conversion"/"converting" of an image or an image being "converted" may refer to updating an image displayed on the display unit by replacing an image that was previously obtained by a camera from among the multiple external cameras 20 (e.g., image 721 and/or 722) with an image that was more recently obtained by the camera (e.g., image 721' and/or 722'), for example, during or after movement of the robot 100 along a driving path.

Meanwhile, in the above example, has been described a method to specify multiple cameras located on the driving path of the robot 100 based on the driving path of the robot 100. However, the controller 350 may specify cameras located near the robot 100 in real time or at preset time intervals, based on the current location of the robot 100. And, the controller 350 may re-specify the cameras when angles of view of the pre-specified cameras do not contain information about a specific space corresponding to the current location of the robot 100 as the current location of the robot 100 changes. Accordingly, the space images output to the sub-area (B) of the display unit 330 may be images received from different cameras that have been re-specified as the robot's current location changes.

Meanwhile, the controller 350 may determine whether the angle of view of the pre-specified camera includes information about the specific space corresponding to the current location of the robot 100, by comparing the space image received from the specified camera with the robot image. In this case, the controller may newly specify the camera when a similarity between the space image received from the pre-specified camera and the robot image does not meet a preset criteria as a result of the image comparison.

Furthermore, the controller 350 may use information about the cameras placed in the space (e.g., information on an angle of view), to determine whether the angle of view of the pre-specified camera includes information about the specific space corresponding to the current location of the robot 100.

Below, descriptions will be given of a method to compare a similarity between an image received from the camera included in the robot 100 and images received from the cameras placed in the space and to select at least one camera based on the similarity.

The controller 350 may select a camera that captures images with a lowest similarity to the robot image received from the robot among the multiple cameras when there are multiple cameras placed in the specific space corresponding to the current location of the robot 100.

This is to provide information as much as possible about the space that cannot be provided by the angle of view of the camera included in the robot 100. Here, the specific space is within a distance range established based on the current location of the robot 100, which may be a meaningful space for reference to remotely control the robot 100.

Here, the multiple cameras may be cameras located on the driving path of the robot 100. In other words, angles of view of the multiple cameras may be configured to include spaces corresponding to the driving path of the robot 100. For example, the above multiple cameras may be cameras with the same direction (e.g., a driving direction) based on the driving path of the robot 100. This is to provide maximum information about the space that cannot be provided with the angle of view of the camera included in the robot 100.

The controller 350 may compare a similarity between the robot image received from the camera included in the robot and multiple images received from the multiple specific cameras located in the specific space. The controller 350 may also specify at least one of the images received from the specific cameras based on the similarity and output it to the display unit 330.

Among the multiple cameras located in the above specific space, the controller 350 may select a camera that captures an image having a lowest similarity to the robot image, and output the image captured from the selected camera to the display unit 330. Therefore, among the multiple images received from the above multiple specific cameras, the image having the lowest similarity to the robot image received from the camera included in the robot may be output to the display unit 330. As previously described, the robot image may be output to the main area (A), and the images received from the cameras placed in the space (space images) may be output to the sub-area (B). Furthermore, the map image may also be output together to the display unit 330.

Below, will be described a method to select a camera by considering environmental information of the space. When there are multiple cameras placed in the specific space corresponding to the current location of the robot 100, the controller 350 may select at least one camera based on environment information of the space among the multiple cameras.

Here, the environment information may be related to congestion of the space (e.g., the congestion caused by arrangement of people or things). In other words, the controller 350 may select a camera that captures an area (space) including specific environment information among the multiple cameras, and output images received from the selected camera to the display unit 330. In this instance, the multiple cameras may be cameras located on the driving path of the robot 100. In other words, angles of view of the multiple cameras may be configured to include spaces corresponding to the driving path of the robot 100.

Meanwhile, the specific environment information may relate to the congestion of the space as described above. The controller 350 may use an image analysis algorithm to extract the specific environment information from images received from the cameras.

As described above, the robot image is output to the main area (A), and images received from the cameras placed in the space (space images) may be output to the sub-area (B). Furthermore, the map image may also be output together to the display unit 330.

As described above, the robot control method and system according to at least some example embodiments may provide not only a robot image captured from the robot, but also images received from the cameras placed in the space to which the robot belongs. Therefore, managers can monitor and control the robot by considering even the robot's blind spots, by being comprehensively provided with information about the space.

Meanwhile, in the above embodiments, have been described that the robot image is provided to the main area of the display, and the images received from the cameras placed in the space are provided to the sub-areas of the display. Furthermore, according to at least some example embodiments, based on a user input to the sub-area (B), it is possible to control an output location of the sub-area (B) placed on the display unit 330 or to perform a conversion between space images output to the sub-area (B).

Here, the user input may be an input applied to the display unit 330. More specifically, the user input applied to the display unit 330 according to at least some example embodiments may be an input applied through the input unit 340.

Figure 7A:
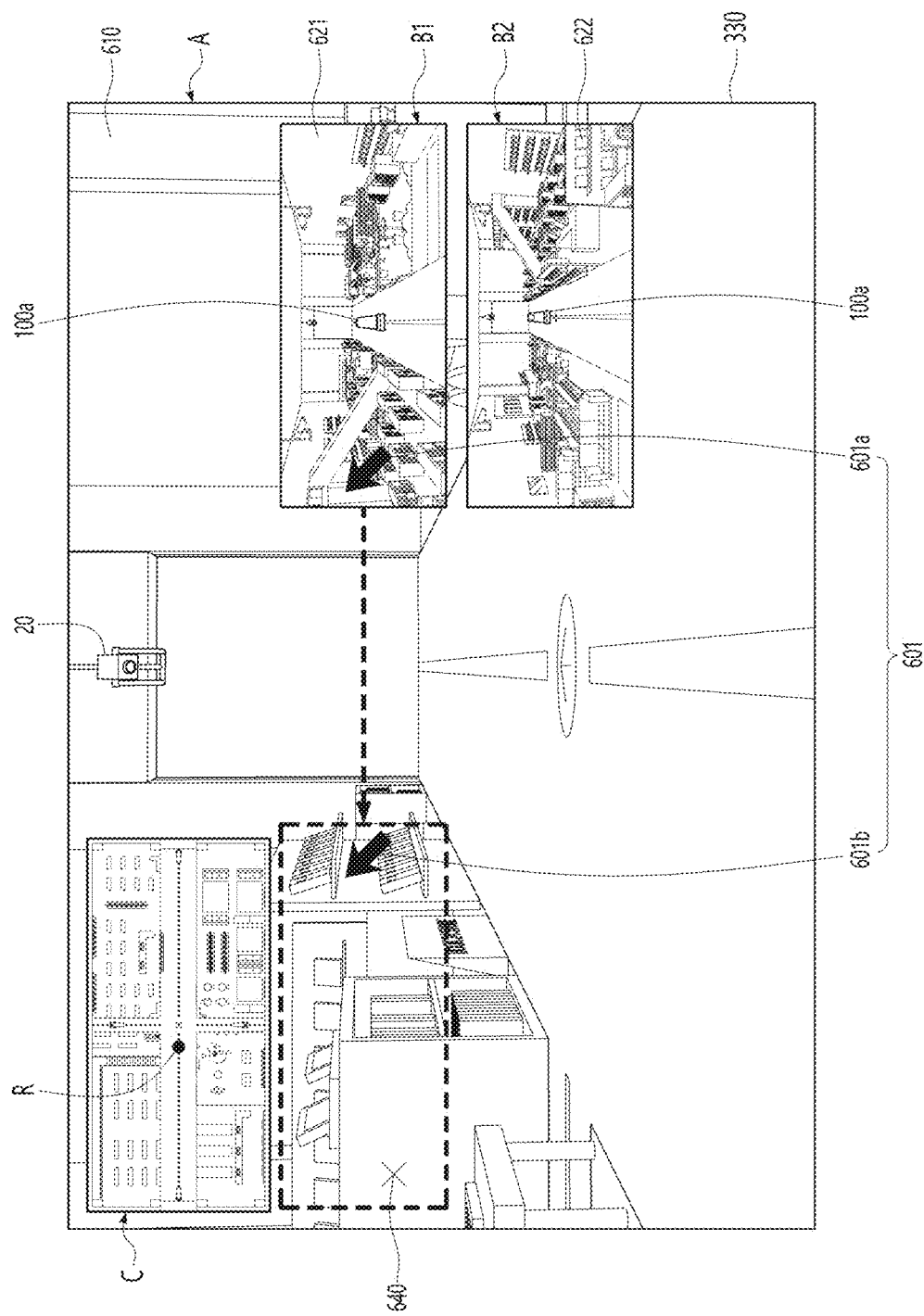
Figure 7B:
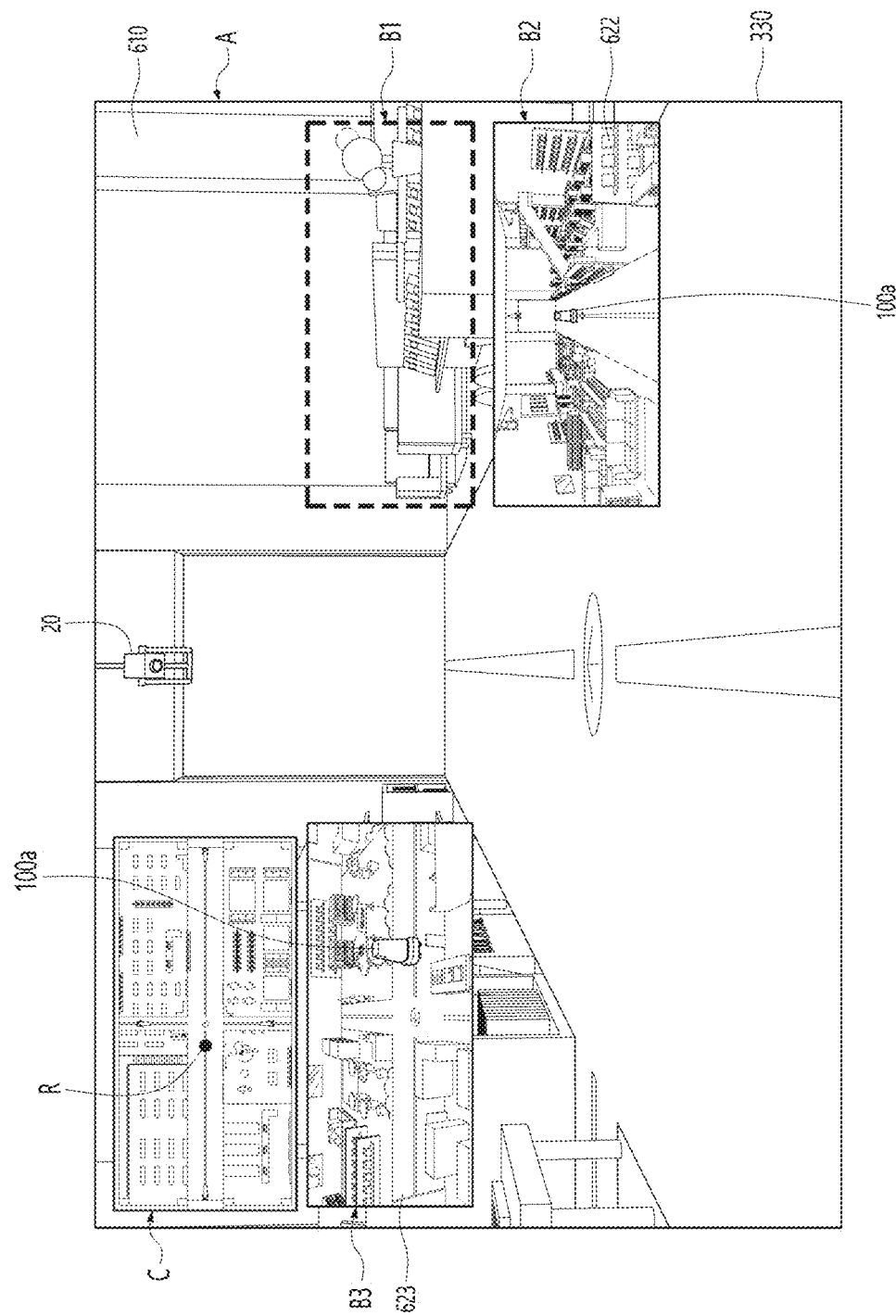

For example, the controller 350 may change the output location of the sub-areas (B1, B3) as shown in FIGS. 7a and 7b, when a drag input is received to drag a cursor image (e.g., refer to reference numerals 601, 601a, 601b in FIG. 7a) by using the input unit 340, as shown in FIG. 7a. Here, as shown in FIG. 7a, the controller 350 may change the images output to the sub-areas (B1, B3) depending on a location of an area 640 where the sub-area (B1) is dragged, as shown in FIG. 7a and FIG. 7b.

The controller 350 may receive space images from different cameras according to a user input, based on the driving direction of the robot 100 (see 550, FIG. 5a), depending on an area among the top, bottom, right and left of the display unit 330 to which the sub-area has been moved.

For example, when the sub-area (B1) output to the first region is moved to the second region (640, corresponding to the left side of the display unit 330) based on a user input as shown in FIG. 7a, the controller 350 may receive images from a camera which captures the space corresponding to the left side of the robot 100. Thus, as shown in FIG. 7b, the output location of the sub-area (B3), and the camera which provides images output to the sub-area (B3) may be changed based on the user input. Here, the left side of the robot 100 is a specific area based on an assumption that a driving direction (550, refer to FIG. 5a) of the robot 100 is the front side of the robot 100.

As such, according to at least some example embodiments, the controller 350 may re-specify a camera that captures images to be output to the sub-area (B1), depending on where the sub-area (B1) is moved, based on a user input.

In addition, though not shown, in a case that the sub-area has been moved based on a user input, the controller 350 may receive a user input whether to re-specify a camera which provides images included in the sub-area. In this case, the display unit 330 may output relevant guidance information, and the controller 350 may perform at least one of the movement of the sub-area and the re-specification of the camera according to the received user input based on the guidance information.

Meanwhile, in the above examples above, have been made descriptions about a method to provide robot and space images on the display unit. However, according to at least some example embodiments, it is possible to directly generate and transmit control commands for the robot by the robot control system. In other words, the controller 350 may generate control commands to control the robot's driving, based on a user input to the display unit 330. For example, control commands may include various commands related to the robot's driving, such as a driving direction, a driving speed, whether there exists driving or not, a driving distance and a driving path of the robot. The robot 100 may drive on the basis of control commands received through the robot control system 300.

Meanwhile, as described above, the user input may be an input applied through the input unit 340. The type of the input unit 340 may vary, and include at least one of a mechanical input method (or mechanical keys, for example, a mouse, a joystick, physical buttons, a dome switch, a jog wheel, a jog switch, etc.), and a touch input method.

Furthermore, the user input to the display unit 330 may include at least one of i) an inputs through direct touch to the display unit 330 configured as a touch screen and ii) an input applied to the display unit 330 by using a separate input means such as a mouse, as a medium.

As described above, the robot control method and system according to at least some example embodiments may receive images from the cameras placed in the space where the robot is located and provide the received images. This allows the user to grasp situation information around the robot at a glance, even if he/she is not located around the robot.

Furthermore, through this, the robot control method and system according to at least some example embodiments can provide the images from the cameras placed in the space where the robot is located, together with images received from the robot. This allows the user to remotely control the robot by considering even the robot's blind spots, by being provided with images with different angles of view from the camera included in the robot.

As such, At least some example embodiments provide a user environment that can comprehensively provide the surrounding environment information around the robot, thereby allowing the user to perform more accurate control of the robot by considering the surrounding environment when controlling the robot remotely.

At least some example embodiments may be embodied by one or more processors executing program code, which can be stored in a computer-readable medium.

Further, at least some example embodiments may be implemented by a computer-readable program code or instructions stored on a computer-readable medium. For example, at least some example embodiments may be provided in the form of a program.

The computer-readable medium includes all types of recording devices for storing data which can be read by a computer system. Examples of the computer-readable medium include a Hard Disk Drive (HDD), a Solid State Disk (SSD), a Silicon Disk Drive (SDD), ROM, RAM, CD-ROM, a magnetic tape, a floppy disk, an optical data storage device, etc.

Further, the computer-readable medium includes a storage unit which may be a server or a cloud storage unit to which an electronic device can access through communications. In this case, the computer may download a program according to at least some example embodiments from the server or the cloud storage unit, through wired or wireless communications.

Further, according to at least some example embodiments, the aforementioned computer is an electronic device where a processor, e.g., a Central Processing Unit (CPU) is mounted, and there is no limitation in a type of the computer.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A robot control method, the method comprising:
   receiving, from a robot located in a space, location information of the robot;
   specifying, based on the received location information, at least a first camera and a second camera from among a plurality of external cameras located in the space, the first camera and the second camera being specified based on a driving direction of the robot;
   at least one of the first camera or the second camera being located at a first location in the space, the first location corresponding to the received location information;
   receiving a robot image and at least one space image, the robot image being an image obtained by a robot camera included in the robot and the at least one space image including at least one image obtained by at least one of the first camera or the second camera; and
   outputting the received robot image and the at least one space image to a display unit,
   wherein the received robot image is output to a main area of the display unit,
   wherein the at least one space image includes a first image obtained by the first camera and a second image obtained by the second camera,
   wherein the first image is output to a first sub-area on the display unit and the second image is output to a second sub-area on the display unit,
   wherein locations of the first sub-area and the second sub-area on the display unit are determined based on the driving direction of the robot,
   wherein the display unit is equipped in a device that remotely manages the robot, and
   wherein both the received robot image and the at least one space image are displayed on the display unit away from the robot.

2. The method of claim 1,
   wherein
   the first camera has an angle of view that corresponds to a first area of the space and the first area corresponds to the driving direction of the robot, and
   wherein the first camera is specified based on a plurality of cameras placed in a specific space corresponding to a current location of the robot.

3. The method of claim 2,
   wherein the second camera has having an angle of view that corresponds to a second area of the space, the second area corresponding to a direction opposite to the driving direction of the robot, and wherein the second sub-area
does not overlap with the first sub-area on the display unit.

4. The method of claim 3,
wherein the first sub-area and the second sub-area on the display unit to which the first image and the second image are output, respectively, each overlap the main area on the display unit.

5. The method of claim 1, further comprising:
comparing a similarity between the received robot image and one or more images obtained by one or more of the plurality of external cameras located in the space.

6. The method of claim 5, further comprising:
outputting to the display unit an image, from among the one or more images obtained by the one or more of the plurality of external cameras, having a lowest similarity to the received robot image.

7. The method of claim 1,
wherein the specifying of at least the first camera and the second camera comprises:
specifying a first plurality of cameras located on a driving path of the robot, from among the plurality of external cameras,
wherein the outputting comprises:
outputting, to the display unit, one or more space images from among a plurality of space images obtained by the first plurality of cameras; and
converting the one or more space images output to the display unit during or after driving of the robot along the driving path.

8. The method of claim 7,
wherein the specified first plurality of cameras includes a third camera closest to the robot based on a current location of the robot,
wherein the outputting of the of the one or more space images includes changing from outputting an image obtained by the third camera to the display unit to outputting an image obtained by a fourth camera to the display unit, in response to a camera closest to a current location of the robot changing from the third camera to the fourth camera as the robot drives along the driving path, and
wherein the first plurality of cameras includes the third camera and the fourth camera.

9. The method of claim 1, further comprising:
outputting a map image about a location corresponding to the location information to the display unit.

10. A robot control system, the system comprising:
a display;
communication circuitry configured to receive, from a robot located in a space, location information of the robot; and
controller circuitry configured to specify, based on the received location information, at least a first camera and a second camera from among a plurality of external cameras located in the space, the first camera and the second camera being specified based on a driving direction of the robot,
at least one of the first camera or the second camera being located at a first location in the space, the first location corresponding to the received location information,
wherein the controller circuitry is configured to,
receive a robot image and at least one space image, the robot image being an image obtained by a robot camera included in the robot and the at least one space image including at least one image obtained by at least one of the first camera or the second camera, and
control the display to output the received robot image and the at least one space image,
wherein the received robot image is output to a main area of the display,
wherein the at least one space image includes a first image obtained by the first camera and a second image obtained by the second camera,
wherein the first image is output to a first sub-area on the display and the second image is output to a second sub-area on the display,
wherein locations of the first sub-area and the second sub-area on the display are determined based on the driving direction of the robot,
wherein the display is equipped in the system that remotely controls the robot, and
wherein both the received robot image and that at least one space image are displayed on the display away from the robot.

11. A robot control method, the method comprising:
receiving, from a robot located in a space, location information of the robot;
specifying, based on the received location information, at least one external camera from among a plurality of external cameras located in the space,
the at least one external camera being located at a first location in the space, the first location corresponding to the received location information;
receiving a robot image and at least one space image, the robot image being an image obtained by a robot camera included in the robot and the at least one space image including at least one image obtained by the specified at least one external camera;
determining a similarity between the received robot image and one or more images obtained by one or more of the plurality of external cameras located in the space; and
outputting the received robot image and the at least one space image to a display unit, the at least one space image including an image having a lowest similarity to the received robot image,
wherein the display unit is equipped in a device that remotely manages the robot, and
wherein both the received robot image and the at least one space image are displayed on the display unit away from the robot.

* * * * *